(12) United States Patent
Bannister

(10) Patent No.: US 10,778,581 B2
(45) Date of Patent: *Sep. 15, 2020

(54) SYNTHETIC SUPERNET COMPRESSION

(71) Applicant: NETFLIX, INC., Los Gatos, CA (US)

(72) Inventor: David Bannister, Gainesville, VA (US)

(73) Assignee: NETFLIX, INC., Los Gatos, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/209,896

(22) Filed: Dec. 4, 2018

(65) Prior Publication Data

US 2019/0109788 A1 Apr. 11, 2019

Related U.S. Application Data

(63) Continuation of application No. 15/237,541, filed on Aug. 15, 2016, now Pat. No. 10,263,890.

(51) Int. Cl.
| | |
|---|---|
| *H04L 12/741* | (2013.01) |
| *H04L 12/753* | (2013.01) |
| *H04L 12/715* | (2013.01) |
| *H04L 12/743* | (2013.01) |
| *H04L 12/733* | (2013.01) |

(52) U.S. Cl.
CPC ............ *H04L 45/745* (2013.01); *H04L 45/20* (2013.01); *H04L 45/46* (2013.01); *H04L 45/48* (2013.01); *H04L 45/54* (2013.01); *H04L 45/74* (2013.01); *H04L 45/7457* (2013.01)

(58) Field of Classification Search
CPC ......... H04L 45/20; H04L 45/46; H04L 45/48; H04L 45/54; H04L 45/74; H04L 45/745; H04L 45/7457; H04L 45/748
See application file for complete search history.

(56) References Cited

U.S. PATENT DOCUMENTS

| | | |
|---|---|---|
| 6,963,924 B1 | 11/2005 | Huang et al. |
| 7,453,883 B1 | 11/2008 | Lynch et al. |
| 7,903,666 B1 | 3/2011 | Kumar et al. |
| 7,936,764 B1 | 5/2011 | Krishnan |
| 2004/0107298 A1 | 6/2004 | Westphal |
| 2005/0038907 A1 | 2/2005 | Roeder et al. |

(Continued)

FOREIGN PATENT DOCUMENTS

| | | |
|---|---|---|
| JP | 2005-184482 A | 7/2005 |
| JP | 2016-032226 A | 3/2016 |

OTHER PUBLICATIONS

Machine Translation of JP2005184482(A), 17 pages, original cited on Jun. 2, 2020 IDS (Year: 2005).*

(Continued)

*Primary Examiner* — Paul H Masur
(74) *Attorney, Agent, or Firm* — Artegis Law Group, LLP

(57) ABSTRACT

One embodiment of the present invention sets forth a technique for compressing a forwarding table. The technique includes selecting, from a listing of network prefixes, a plurality of network prefixes that are within a range of a subnet. The technique further includes sorting the plurality of network prefixes to generate one or more subgroups of network prefixes and selecting a first subgroup of network prefixes included in the one or more subgroups of network prefixes. The technique further includes generating a synthetic supernet based on the first subgroup of network prefixes.

27 Claims, 13 Drawing Sheets

(56) References Cited

U.S. PATENT DOCUMENTS

| | | |
|---|---|---|
| 2007/0286186 A1 | 12/2007 | Balandina et al. |
| 2009/0046724 A1 | 2/2009 | Lynch et al. |
| 2011/0128960 A1 | 6/2011 | Bando et al. |
| 2011/0307656 A1* | 12/2011 | Hamdi ............ H04L 45/54 711/108 |
| 2012/0063189 A1 | 3/2012 | Maurya et al. |
| 2013/0003732 A1* | 1/2013 | Dholakia ............ H04L 12/18 370/390 |
| 2013/0088999 A1* | 4/2013 | Thubert ............ H04W 40/248 370/254 |
| 2014/0086248 A1 | 3/2014 | Assarpour |
| 2015/0288605 A1 | 10/2015 | Yan et al. |
| 2016/0182372 A1 | 6/2016 | Holbrook et al. |
| 2017/0070427 A1 | 3/2017 | Zeng et al. |
| 2017/0155587 A1 | 6/2017 | Bannister |

OTHER PUBLICATIONS

Machine Translation of JP2016032226(A), 22 pages, original cited on Jun. 2, 2020 IDS (Year: 2016).*
Bian et al., "IP routing table compression using ESPRESSO-MY", Networks, 2003, ICON2003, The 11th IEEE International Conference on Sep. 28-Oct. 1, 2003, Piscataway, NJ, USA, IEEE, Sep. 28, 2003, pp. 167-172, XP010683520.

* cited by examiner

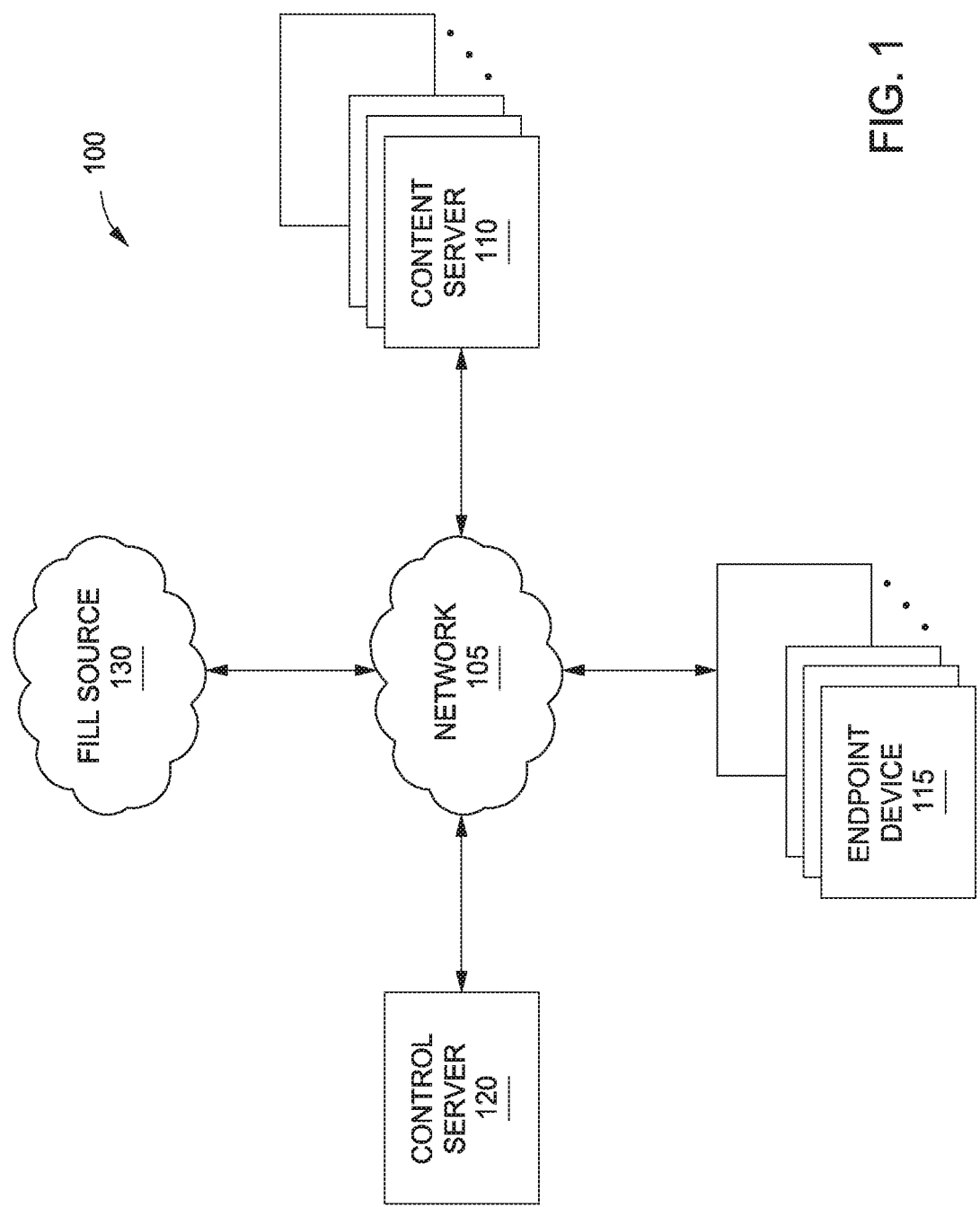

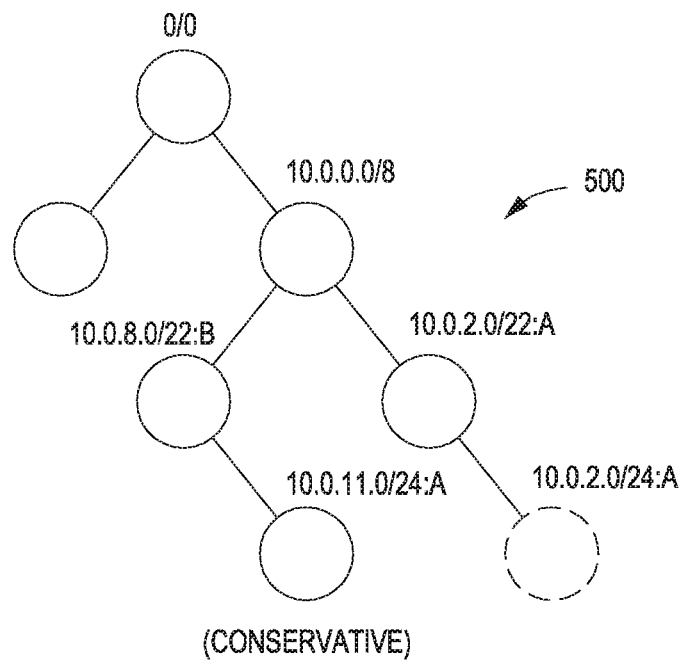
(CONSERVATIVE)
OR
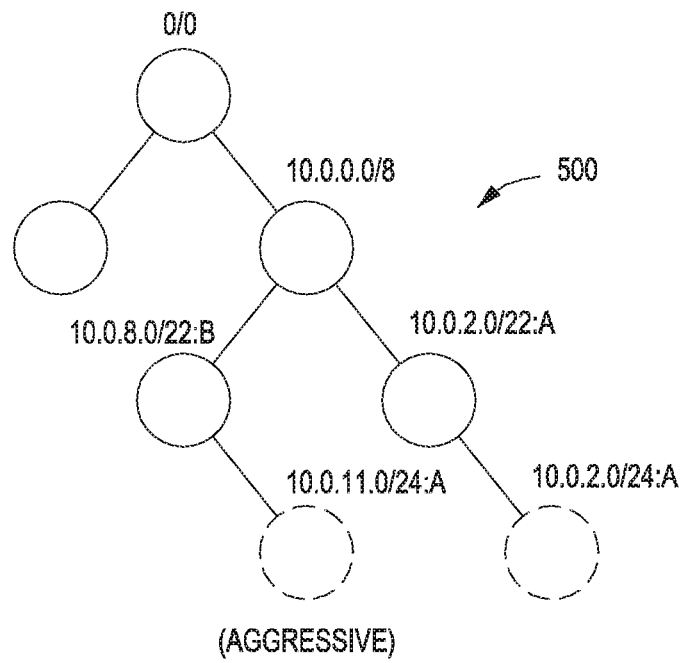
(AGGRESSIVE)
FIG. 5E

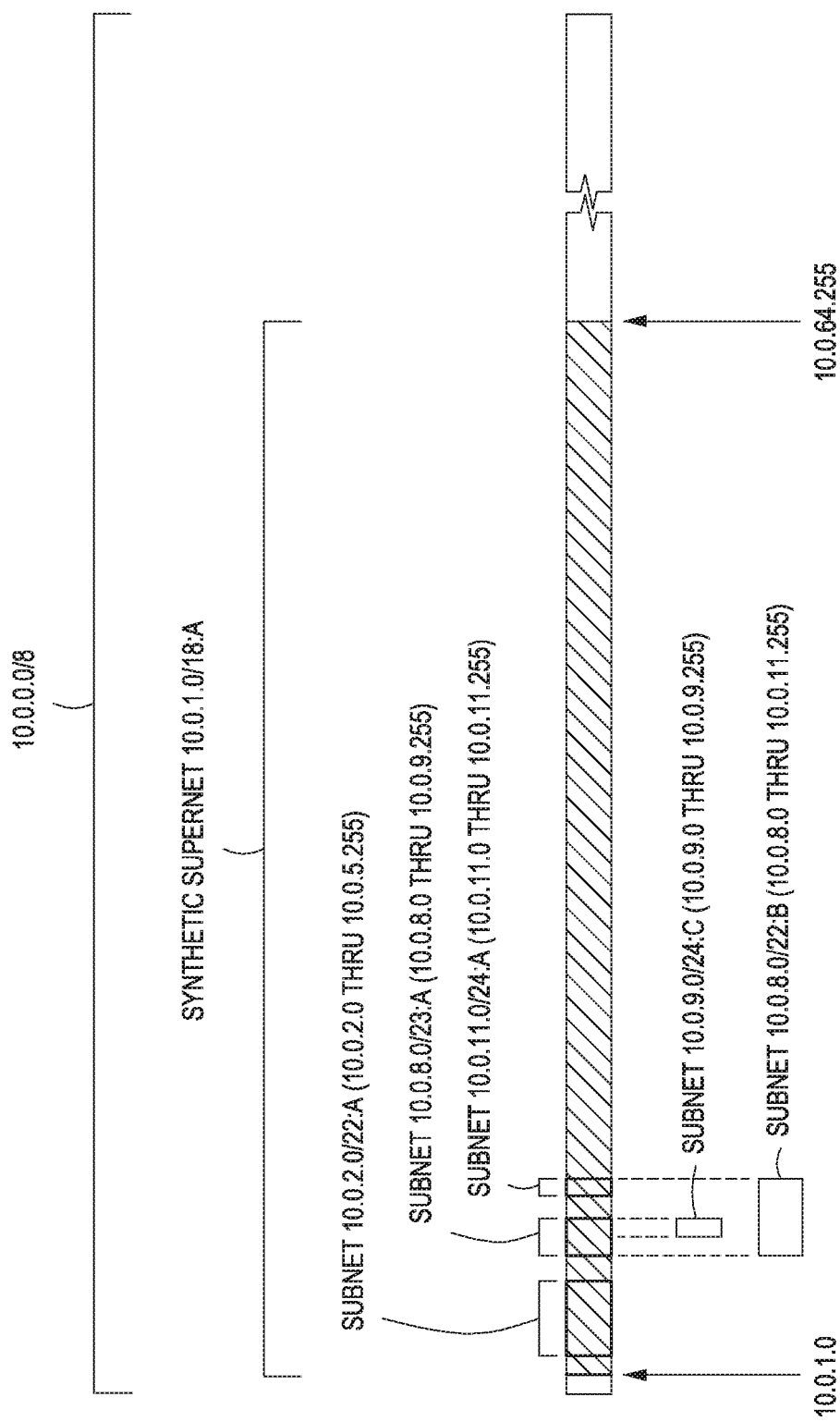

SYNTHETIC SUPERNET COMPRESSION

CROSS-REFERENCE TO RELATED APPLICATIONS

This application is a continuation of the co-pending U.S. patent application titled, "SYNTHETIC SUPERNET COMPRESSION," filed on Aug. 15, 2016 and having Ser. No. 15/237,541. The subject matter of this related application is hereby incorporated herein by reference.

BACKGROUND OF THE INVENTION

Field of the Invention

The present invention relates generally to computer networking and, more specifically, to synthetic supernet compression.

Description of the Related Art

Conventional digital content distribution systems include content servers, control servers, endpoint devices, and a communications network connecting the content servers to the endpoint devices. The content servers typically belong to one or more content delivery networks and are configured to store files corresponding to different content assets that can be downloaded from the content server to the endpoint devices.

In general, the control servers are responsible for managing the delivery of content assets to the endpoint devices in response to requests for such content assets transmitted from the endpoint devices. In order to respond to requests for files received from endpoint devices, one or more routers associated with the content servers are configured to communicate with the control server to determine the location and availability of requested files. The files are then distributed to the appropriate endpoint device from the router(s) and/or via a broader content distribution network.

Various techniques are implemented by a router to determine how to route each file through the communications network to the appropriate endpoint device. For example, in hop-by-hop transport techniques, each router includes a routing table (e.g., a routing information base or "RIB") that stores information associated with the topology of the communications network. More specifically, the routing table typically stores, for each valid destination node, the network address of the next device (the "next hop") to which a data packet can be transmitted in order to reach to the destination node. Each time a router learns a new route along which data packets can be transmitted towards a destination node, the new route is added to the routing table. Additionally, when the router determines that a particular destination node has become unreachable, that destination node may be removed from the routing table.

The routing table is typically stored in random access memory (RAM) and/or on a non-volatile storage device, such as a hard-disk drive (HDD) or a solid-state drive (SSD), within the router. As a result, as more and more routes are added to the routing table, the latency associated with searching the routing table for the next hop for a particular destination node increases. To address this problem, routing information stored in the routing table can be written into a forwarding table (e.g., a forwarding information base or "FIB"), which is implemented in high-speed memory, such as ternary content-addressable memory (TCAM). In addition, to further increase searching efficiency, routing information can be stored in the forwarding table in a tree structure (e.g., a radix tree structure), enabling the next hop and other information associated with a destination node to be quickly retrieved by searching the FIB for a prefix associated with the destination node.

As noted above, the forwarding table enables next hops and other routing information to be retrieved efficiently and without significant latency. However, due to the price and complexity of the high-speed memory in which the forwarding table is implemented, increasing the size the forwarding table above certain thresholds can be cost prohibitive for many applications. Consequently, the sizes of many forwarding tables have not been increased to deal with the increases in the size and complexity of the Internet that have occurred over the years. As a result, in many existing routers, the number of destination nodes stored in the routing table has exceeded the number of entries available in the corresponding forwarding table. Because such routers are unable to store routes for all destination nodes included in the Internet routing table, spillover of excess routes into slower memory, such as RAM, may occur.

As the foregoing illustrates, what is needed are more effective techniques for storing routing information associated with a communications network.

SUMMARY OF THE INVENTION

One embodiment of the present invention sets forth a method for compressing a forwarding table. The method includes selecting, from a listing of network prefixes, a plurality of network prefixes that are within a range of a subnet. The method further includes sorting the plurality of network prefixes to generate one or more subgroups of network prefixes and selecting a first subgroup of network prefixes included in the one or more subgroups of network prefixes. The method further includes generating a synthetic supernet based on the first subgroup of network prefixes.

Further embodiments provide, among other things, a non-transitory computer-readable medium and a networking device configured to implement the method set forth above.

One advantage of the disclosed techniques is that the number of entries included in a forwarding table can be reduced without discarding routing information associated with the destination nodes tracked by the forwarding table. As a result, a greater number of routes may be stored in the forwarding table and/or the memory requirements of the forwarding table may be reduced.

BRIEF DESCRIPTION OF THE DRAWINGS

FIG. 1 illustrates a network infrastructure configured to implement one or more aspects of the present invention;

FIGS. 5A-5E illustrate different entries of a tree structure that are generated during a first compression pass, according to various embodiments of the present invention;

FIG. 8 illustrates network prefix entries associated with a portion of a subnet, according to various embodiments of the invention.

DETAILED DESCRIPTION

Figure 2A:
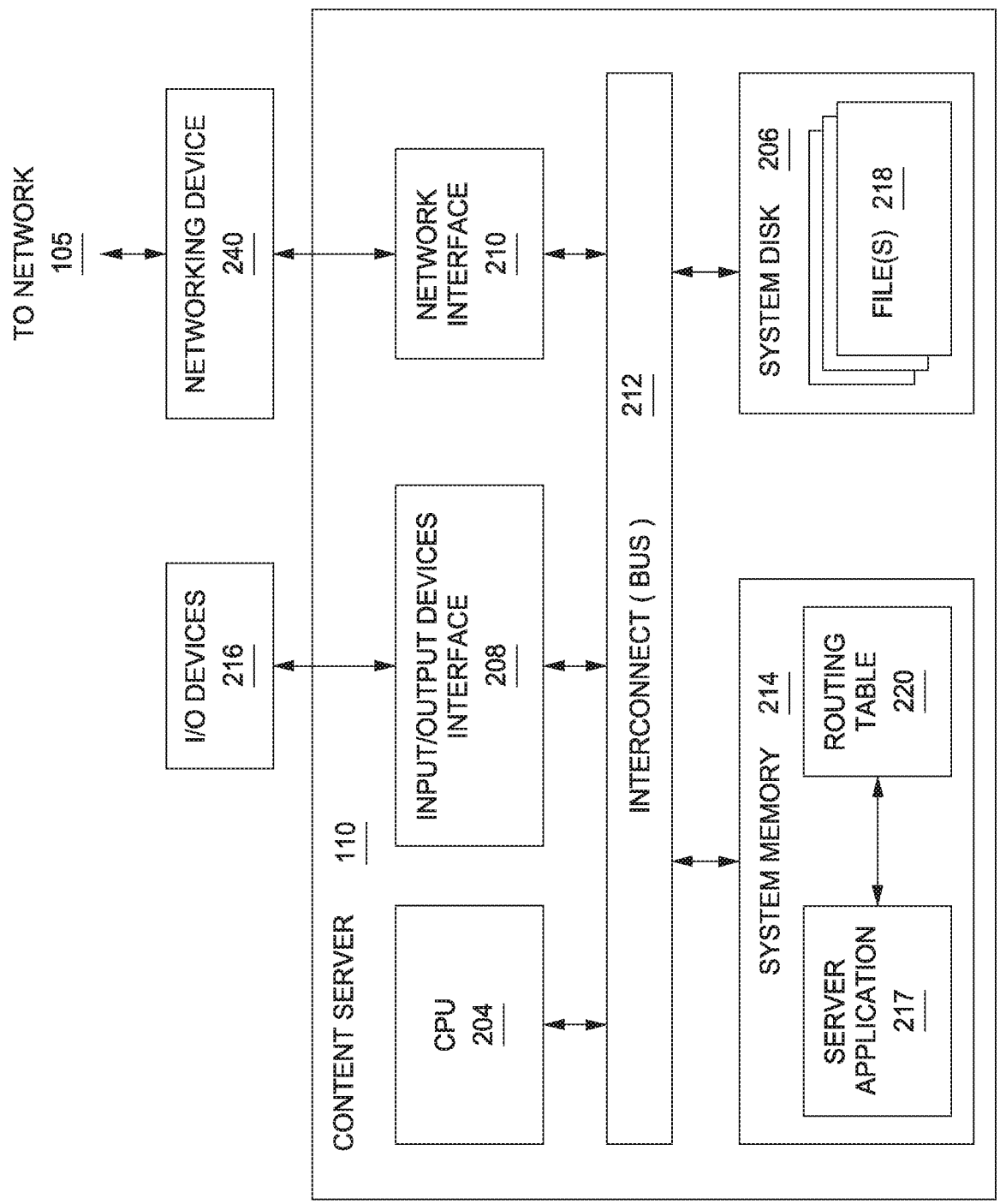
FIG. 2A is a more detailed block diagram of the content server of FIG. 1, according to various embodiments of the present invention.

In the following description, numerous specific details are set forth to provide a more thorough understanding of the embodiments of the present invention. However, it will be apparent to one of skill in the art that the embodiments of the present invention may be practiced without one or more of these specific details.

System Overview

FIG. 1 illustrates a network infrastructure 100 configured to implement one or more aspects of the present invention. As shown, the network infrastructure 100 includes content servers 110, a control server 120, and endpoint devices 115, each of which are connected via a communications network 105.

Each endpoint device 115 communicates with one or more content servers 110 (also referred to as "caches" or "nodes") via the network 105 to download content, such as textual data, graphical data, audio data, video data, and other types of data. The downloadable content, also referred to herein as a "file," is then transferred between one or more content servers 110 and/or presented to users of one or more endpoint devices 115. In various embodiments, the endpoint devices 115 may include computer systems, set top boxes, mobile computer, smartphones, tablets, console and handheld video game systems, digital video recorders (DVRs), DVD players, connected digital TVs, dedicated media streaming devices, (e.g., the Roku® set-top box), and/or any other technically feasible computing platform that has network connectivity and is capable of presenting content, such as text, images, video, and/or audio content, to a user.

Each content server 110 may include a web-server, database, and server application 217 configured to communicate with the control server 120 to determine the network location and availability of various files that are tracked and managed by the control server 120. Each content server 110 may further communicate with a fill source 130 and one or more other content servers 110 in order "fill" each content server 110 with copies of various files. In addition, content servers 110 may respond to requests for files received from endpoint devices 115. The files may then be distributed from the content server 110 or via a broader content distribution network. In some embodiments, the content servers 110 enable users to authenticate (e.g., using a username and password) in order to access files stored on the content servers 110. Although only a single control server 120 is shown in FIG. 1, in various embodiments multiple control servers 120 may be implemented to track and manage files.

In various embodiments, the fill source 130 may include an online storage service (e.g., Amazon® Simple Storage Service, Google® Cloud Storage, etc.) in which a catalog of files, including thousands or millions of files, is stored and accessed in order to fill the content servers 110. Although only a single fill source 130 is shown in FIG. 1, in various embodiments, multiple fill sources 130 may be implemented to service requests for files.

FIG. 2A is a more detailed block diagram of the content server 110 of FIG. 1, according to various embodiments of the present invention. As shown, the content server 110 includes, without limitation, a central processing unit (CPU) 204, a system disk 206, an input/output (I/O) devices interface 208, a network interface 210, an interconnect 212, and a system memory 214. In various embodiments, the content server 110 communicates with other nodes on the network 105 via a networking device 240.

The CPU 204 is configured to retrieve and execute programming instructions, such as server application 217, stored in the system memory 214. Similarly, the CPU 204 is configured to store application data and retrieve application data from the system memory 214. The interconnect 212 is configured to facilitate transmission of data, such as programming instructions and application data, between the CPU 204, the system disk 206, I/O devices interface 208, the network interface 210, and the system memory 214. The I/O devices interface 208 is configured to receive input data from I/O devices 216 and transmit the input data to the CPU 204 via the interconnect 212. For example, I/O devices 216 may include one or more buttons, a keyboard, a mouse, and/or other input devices. The I/O devices interface 208 is further configured to receive output data from the CPU 204 via the interconnect 212 and transmit the output data to the I/O devices 216.

The system disk 206 may include one or more hard disk drives, solid state storage devices, or similar storage devices. The system disk 206 is configured to store non-volatile data such as files 218 (e.g., audio files, video files, etc.) associated with a content catalog. The files 218 can then be retrieved by one or more content servers 110 and/or one or more endpoint devices 115 via the network 105. In some embodiments, the network interface 210 may be configured to operate in compliance with the Ethernet standard.

The system memory 214 includes a server application 217 configured to service requests for files 218 received from endpoint devices 115 and other content servers 110. When the server application 217 receives a request for a file 218, the server application 217 retrieves the corresponding file 218 from the system disk 206 and transmits the file 218 to an endpoint device 115 or a content server 110 via the network 105.

Figure 2B:
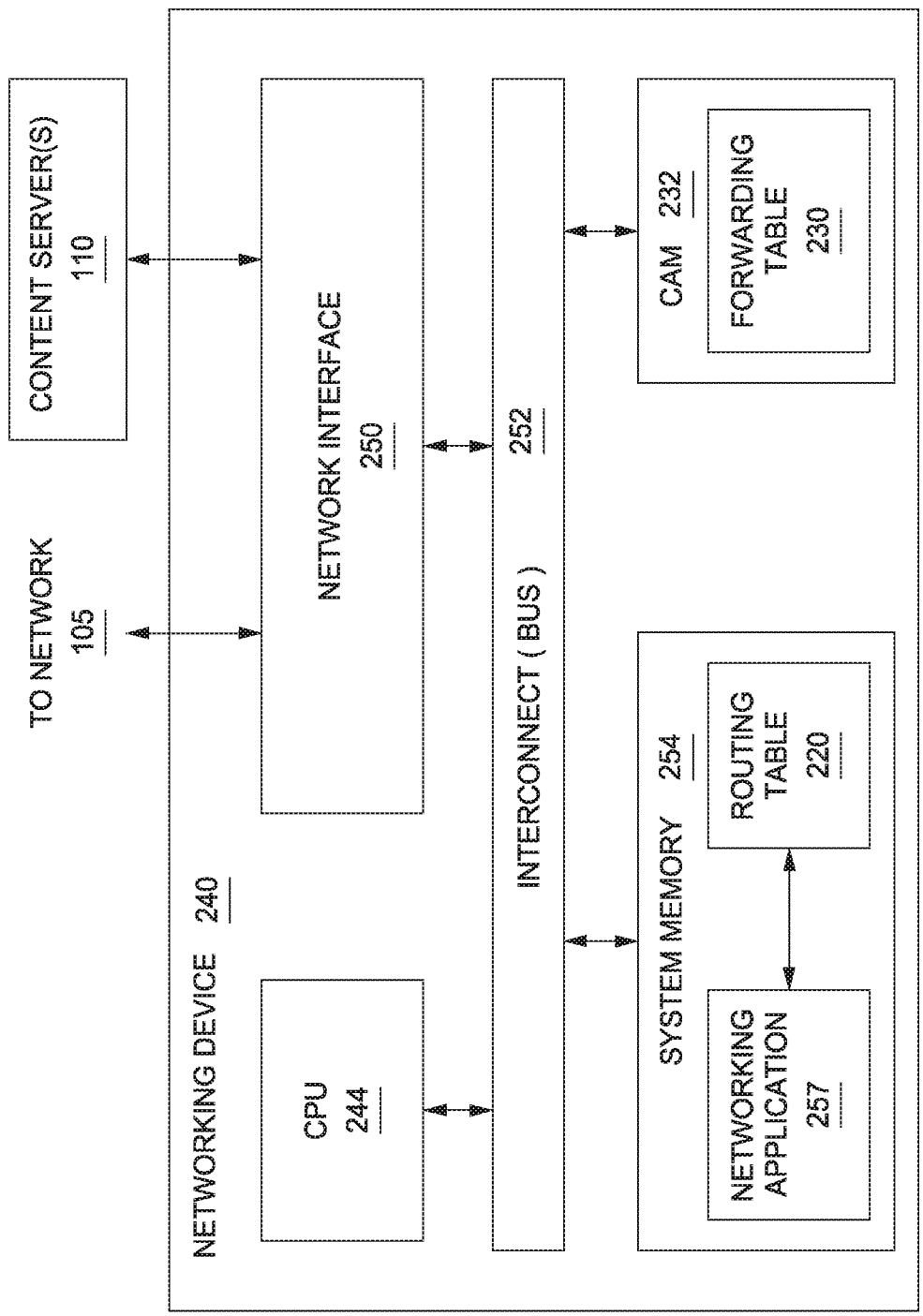
FIG. 2B is a more detailed block diagram of the networking device of FIG. 2A, according to various embodiments of the present invention.

FIG. 2B is a more detailed block diagram of the networking device 240 of FIG. 2A, according to various embodiments of the present invention. As shown, the networking device 240 includes, without limitation, a central processing unit (CPU) 244, a network interface 250, an interconnect 252, a system memory 254, and a content-addressable memory (CAM) 232.

The CPU 244 is configured to retrieve and execute programming instructions, such as networking application 257, stored in the system memory 254. Similarly, the CPU 244 is configured to store application data and retrieve application data from the system memory 254. The interconnect 252 is configured to facilitate transmission of data, such as programming instructions and application data, between the CPU 244, the network interface 250, the system memory 254, and the CAM 232.

The system memory 254 includes a networking application 257 configured to receive and transmit data (e.g., files 218) and/or routing information, such as the destination nodes to which a particular file 218 should be transmitted, via the network 105. In some embodiments, the networking application 257 communicates with one or more transit providers (TPs) and/or the control server 120 to determine routing information associated with destination nodes included in the network 105.

In various embodiments, the networking device 240 is implemented as one or more routers. In such embodiments, the networking application 257 implements a gateway protocol (e.g., border gateway protocol or "BGP") to receive, process, and transmit network routing information, such as the network addresses of nodes (e.g., content servers 110, control servers 120, endpoint devices 115, fill sources 130, etc.) included in the network 105. In some embodiments, the content servers 110, control servers 120, endpoint devices 115, and/or fill sources 130 form one or more autonomous systems (AS), each of which may be managed via a separate gateway service (e.g., a BGP service).

The gateway service implemented by the networking application 257 may receive network topology information associated with all advertised nodes included in the network 105. The network topology information may include a network address for each of the destination nodes as well as the network address of the "next hop" (NH) to which a data packet can be transmitted in order to reach to a particular node in the network 105. The networking application 257 then stores the network addresses, the NHs, and other types of routing information in a routing table 220 (e.g., a routing information base or "RIB"). The networking application 257 may further determine whether each of the nodes in the network 105 is reachable and store this information in the routing table 220.

Each time networking application 257 receives a new route along which data packets can be transmitted towards a particular node in the network 105, the new route may be added to the routing table 220. Additionally, when the router determines that a particular node has become unreachable, the network address and routing information associated with that node may be removed from the routing table 220. In some embodiments, the routing table 220 stores, for each destination node, the network address of the destination node and routing information associated with the destination node, such as one or more NHs, one or more autonomous system numbers (ASNs) associated with the NH(s), a time value associated with each NH(s), and other types of attributes associated with specific NHs and/or ASNs. The network address and/or NH(s) associated with each node may be stored in the routing table 220 in any format. For example, the network address and/or NH(s) may be stored in the Internet Protocol version 4 (IPv4) format, the Internet Protocol version 6 (IPv6) format, as a network address prefix (e.g., /8, /16, /24, etc.) associated with a particular format, and/or in any other technically feasible format.

As more and more routes are added to the routing table 220, the latency associated with searching the routing table 220 for the NH(s) for a particular destination node increases. Consequently, the networking application 257 writes the routes into a forwarding table 230 (e.g., a forwarding information base or "FIB") included in the network interface 210. In contrast to the routing table 220, which may be stored in system memory 214, the forwarding table 230 may be implemented in a high-speed memory (e.g., a ternary content-addressable memory or "TCAM"). In some embodiments, the high-speed memory includes an application-specific integrated circuit (ASIC) configured to perform lookup operations on the contents of the forwarding table 230.

Further, to enable the forwarding table 230 to be more efficiently searched, network addresses associated with the destination nodes may be stored in the forwarding table 230 in a tree structure (e.g., a radix tree structure). In some embodiments, the networking application 257 writes a route from the routing table 220 to the forwarding table 230 by reading a network address from the routing table 220, storing a network prefix associated with the network address in an entry of the forwarding table 230, and associating the corresponding routing information with the entry. For example, the networking application 257 may store a network prefix associated with the network address of a destination node in an entry of a radix tree included in the forwarding table 230. The networking application 257 may then store the corresponding routing information in the forwarding table 230 and link the routing information to the entry (e.g., via a pointer).

Figure 3:
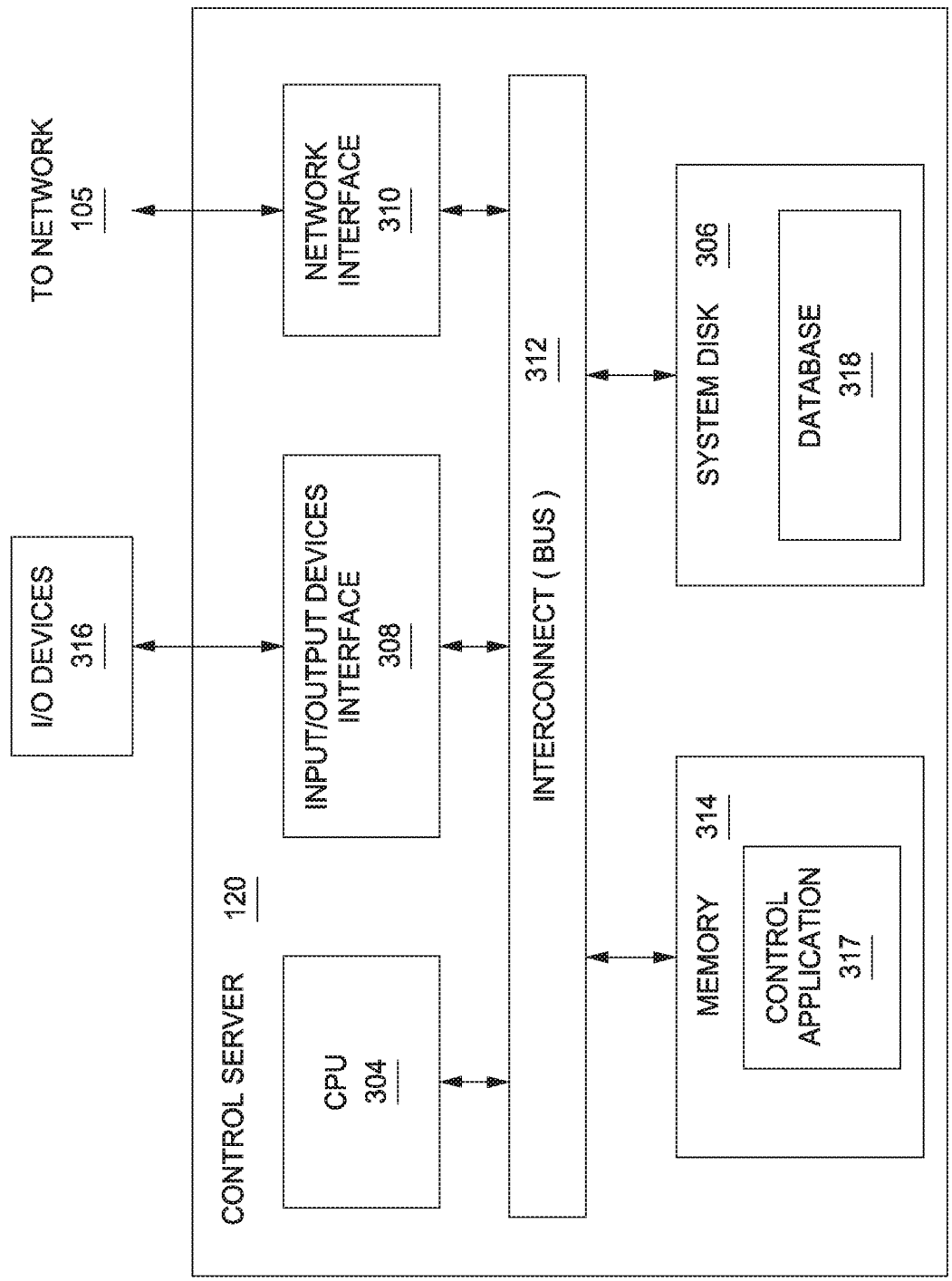
FIG. 3 is a more detailed block diagram of the control server of FIG. 1, according to various embodiments of the present invention.

FIG. 3 is a more detailed block diagram of the control server 120 of FIG. 1, according to various embodiments of the present invention. As shown, the control server 120 includes, without limitation, a central processing unit (CPU) 304, a system disk 306, an input/output (I/O) devices interface 308, a network interface 310, an interconnect 312, and a system memory 314.

The CPU 304 is configured to retrieve and execute programming instructions, such as control application 317, stored in the system memory 314. Similarly, the CPU 304 is configured to store application data and retrieve application data from the system memory 314 and a database 318 stored in the system disk 306. The interconnect 312 is configured to facilitate transmission of data between the CPU 304, the system disk 306, I/O devices interface 308, the network interface 310, and the system memory 314. The I/O devices interface 308 is configured to transmit input data and output data between the I/O devices 316 and the CPU 304 via the interconnect 312. The system disk 306 may include one or more hard disk drives, solid state storage devices, and the like. The system disk 206 is configured to store a database 318 of information associated with the content servers 110, the fill source(s) 130, and the files 218.

The system memory 314 includes a control application 317 configured to receive requests for files 218 from one or more endpoint devices 115 and/or one or more content servers 110. The control application 317 may then access information stored in the database 318 and process the information to determine the manner in which specific files 218 will be transmitted to endpoint devices 115 and/or replicated across the content servers 110. The control application 317 may further generate licenses for files 218 requested by the endpoint devices 115.

Forwarding Table Compression

As described above, the forwarding table 230 enables NHs and other routing information associated with destination nodes to be retrieved efficiently and without significant latency. However, due to the price and complexity of the high-speed memory used to implement the forwarding table 230, increasing the storage capacity of the forwarding table 230 above certain thresholds becomes cost prohibitive for many applications. As a result, as the number of nodes advertised on the Internet has increased, the number of nodes stored in the routing table has exceeded the number of entries available in the forwarding table included in many routers.

For example, many commercial routers include a content-addressable memory (CAM) capable of storing 512,000 entries. However, the Internet routing table currently includes routes for approximately 550,000 destination nodes. Consequently, many routers are unable to store routes for all advertised destination nodes and/or may spillover routes for excess destination nodes into slower memory, such as the system memory 214, decreasing router performance.

Accordingly, in various embodiments, the networking application 257 performs two or more compression passes on the contents of the forwarding table 230. In a first compression pass, the networking application 257 receives a network prefix and looks for an existing, shorter network prefix that represents a partial match with the network prefix. If a partial match exists, then the networking application 257 compares routing information associated with the shorter network prefix to routing information associated with the network prefix. If the routing information is the same (or similar) between the network prefixes, then the networking application 257 compresses the forwarding table 230 by removing the network prefix from the forwarding table and aggregating the corresponding routing information in an entry associated with the shorter network prefix.

In a second compression pass, the networking application 257 selects a subnet and groups network prefix entries that are in the range of the subnet based on routing information associated with those network prefixes. The largest subgroup of network prefixes that shares the same (or similar) routing information is then selected, and a synthetic supernet associated with those network prefixes is generated and installed into the forwarding table 230. Accordingly, network prefixes that are within the range of the synthetic supernet and have the same (or similar) routing information as the synthetic supernet may be removed from and/or not installed to the forwarding table 230. Such techniques are described below in further detail in conjunction with FIGS. 4-8.

First Compression Pass

Figure 4A:
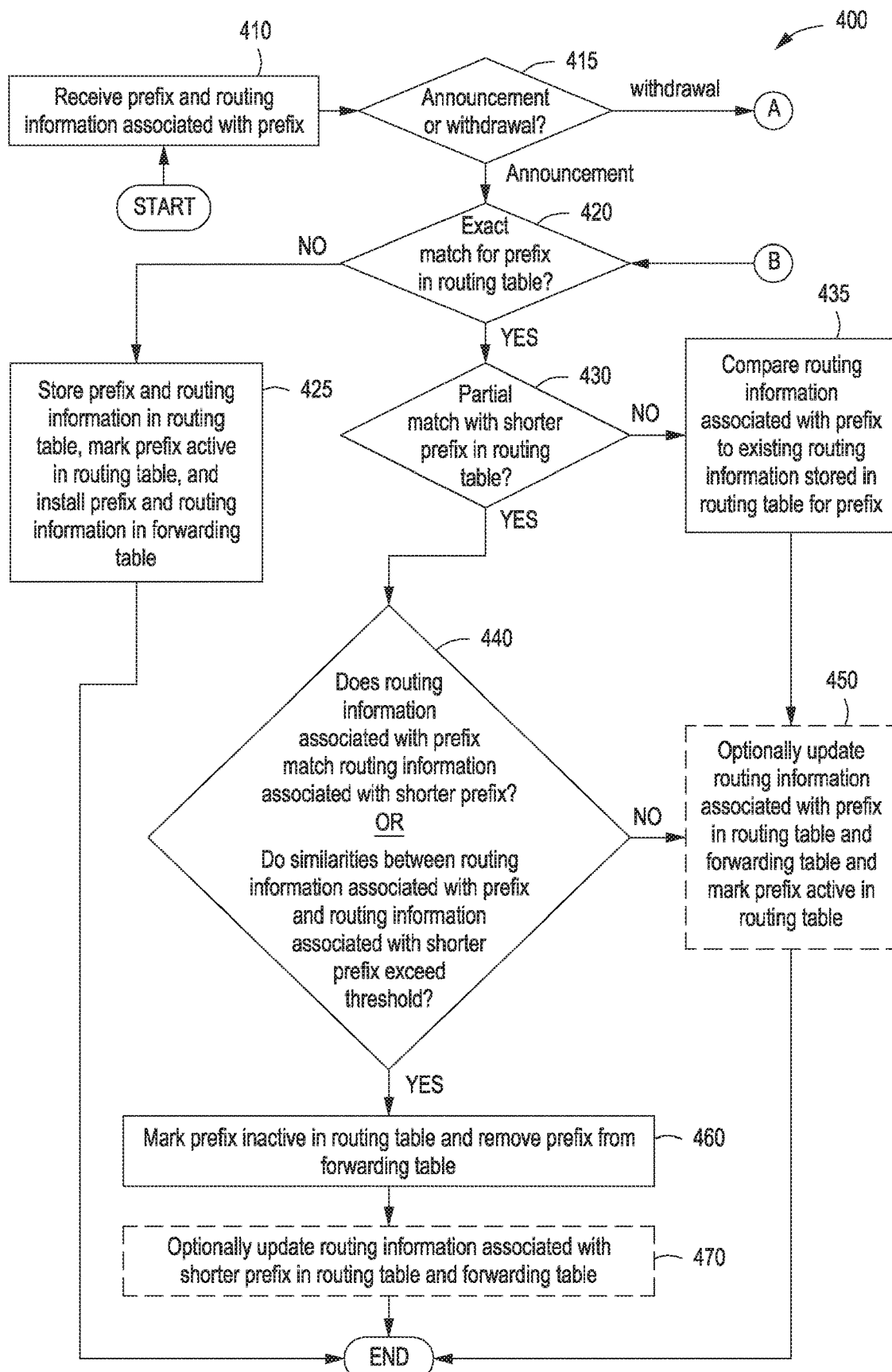
FIGS. 4A and 4B illustrate a flow diagram of method steps for compressing a forwarding table during a first compression pass, according to various embodiments of the present invention.
Figure 4B:
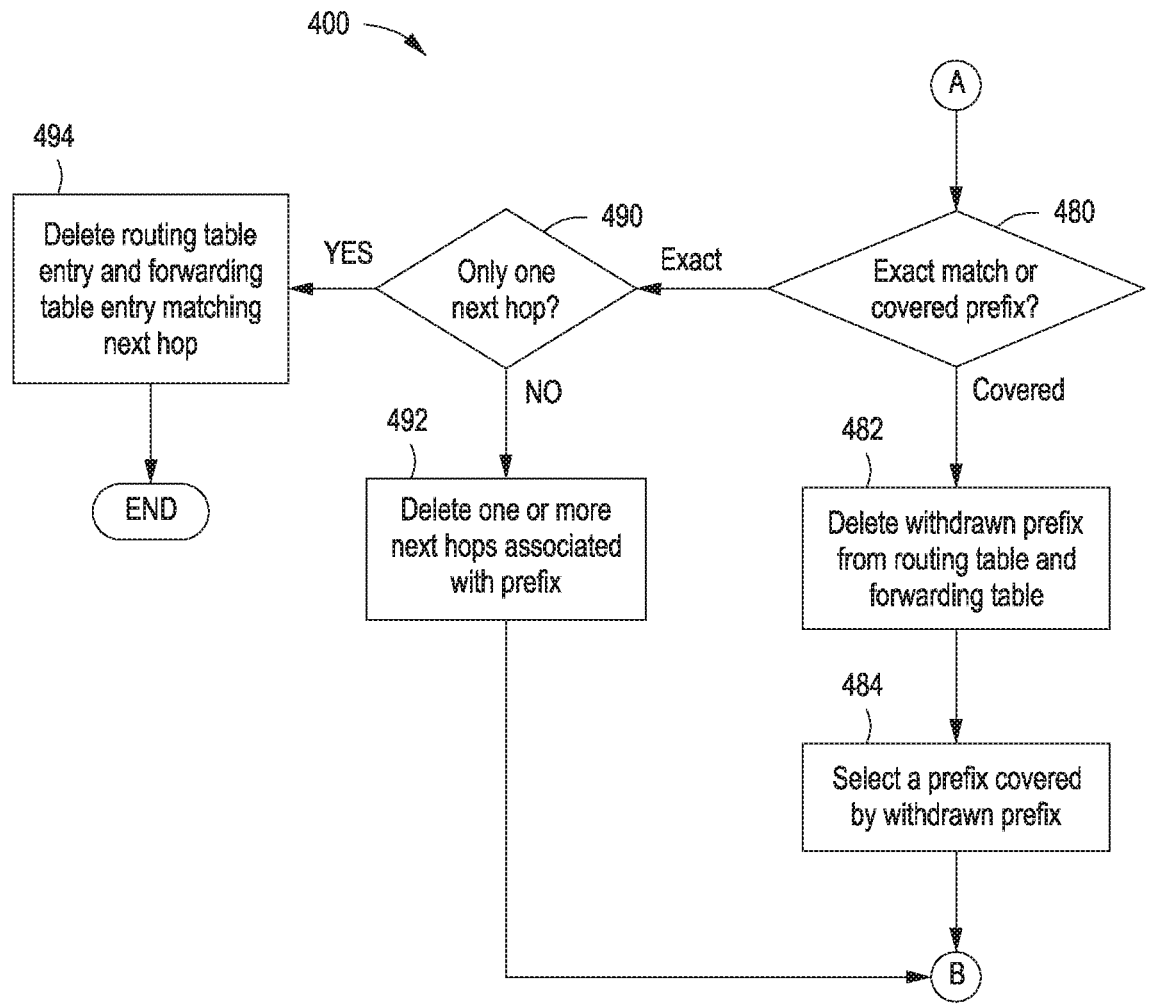

FIGS. 4A and 4B illustrate a flow diagram of method steps for compressing a forwarding table 230 during a first compression pass, according to various embodiments of the present invention. Although the method steps are described in conjunction with the systems of FIGS. 1-3 and 5A-5E, persons skilled in the art will understand that any system configured to perform the method steps, in any order, falls within the scope of the present invention.

As shown in FIG. 4A, a method 400 begins at step 410, where the networking application 257 receives a network prefix and routing information associated with the network prefix. In some embodiments, the network prefix is associated with a destination node included in the network 105, such as a specific content server 110, control server 120, endpoint device 115, or fill source 130. In general, the routing information may include any type of information associated with the topology and/or status of the network 105 and/or a destination node within the network 105. Examples of routing information include, without limitation, NHs, the ASNs associated with NH(s), and time values associated with NHs.

In some embodiments, network prefixes and associated routing information are received by the networking application 257, at step 410, when the gateway service discovers a new destination node in the network 105, such as by receiving a listing of routes from a transit provider (TP). In some embodiments, network prefixes and associated routing information are received from a registry, such as a Regional Internet Registry (RIR). Additionally, in some embodiments, a network prefix is received by the networking application 257 when the networking application 257 performs a covered lookup based on a specific network prefix. For example, the networking application 257 may perform a covered lookup on the routing table 220 and/or forwarding table 230 based on a /22 network prefix (e.g., 10.0.2.0/22:A) and, in response, receive all of the /24 network prefixes (e.g., 10.0.2.0/24:A) that are within the range of (i.e., are "covered" by) the /22 network prefix.

Additionally or alternatively, in various embodiments, a network prefix may be received by the networking application 257 from the control application 317 included in the control server 120. For example, the control application 317 could receive a request for a file 218 from an endpoint device 115, determine a network address associated with the endpoint device 115, and transmit the network address and/or a network prefix associated with the endpoint 115 to the networking application 257. In some embodiments, the control application 317 may include a content control system (CCS) implemented via a cloud computing service, such as Amazon Web Services® (AWS). Accordingly, in such embodiments, the control application 317 may generate a license for the requested file 218 before or after transmitting the network address and/or network prefix associated with the endpoint 115 to the networking application 257.

At step 415, the networking application 257 determines whether the network prefix is a prefix announcement or a prefix withdrawal. If the networking application 257 determines that the network prefix is a prefix withdrawal then, the method 400 proceeds to step 480, shown in FIG. 4B. If, on the other hand, the networking application 257 determines that the network prefix is a prefix announcement then, the method 400 proceeds to step 420.

Next, at step 420, the networking application 257 performs a lookup on the routing table 220 and/or forwarding table 230 to determine whether an exact match exists for the network prefix. For example, with reference to FIG. 5A, which illustrates entries 510 of a tree structure 500 stored within the forwarding table 230, the networking application 257 could perform a lookup on the forwarding table 230 to determine whether an entry 510 exists for 10.0.2.0/24:A. If an exact match for the network prefix does not exist, then the method 400 proceeds to step 425.

Figure 5A:
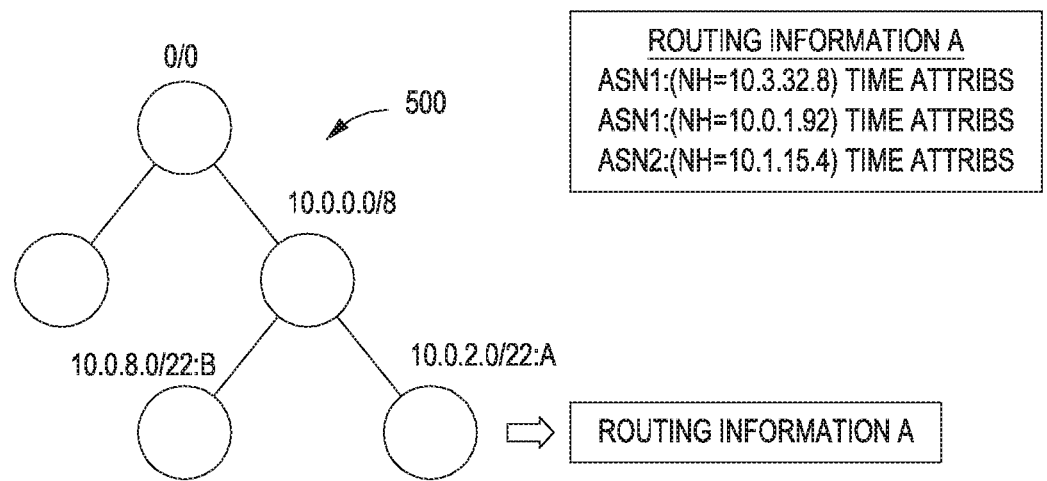
Figure 5B:
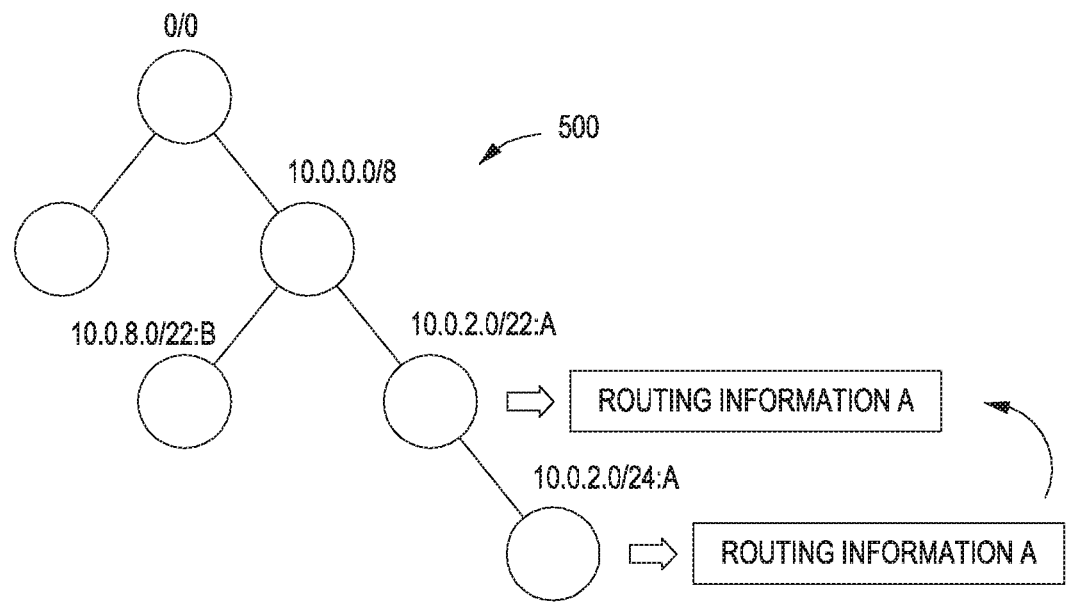

At step 425, the networking application 257 stores the network prefix and associated routing information in the routing table 220 and writes the network prefix and associated routing information in the forwarding table 230, as shown in FIG. 5B. The networking application 257 further marks the network prefix as active in the routing table 220, indicating that the network prefix should be (or has been) written to an entry 510 of the forwarding table 230. The method 400 then terminates.

Returning to step 420, if an exact match for the network prefix exists, then the method 400 proceeds to step 430. At step 430, the networking application 257 performs a lookup on the routing table 220 and/or forwarding table 230 to determine whether a partial match exists for the network prefix. In some embodiments, the networking application 257 determines whether a partial match exists for the network prefix by looking back up the tree structure 500 to determine whether an entry 510 for a shorter, covering network prefix already exists in the tree structure 500. For example, with reference to FIG. 5B, the networking application 257 could look back up the tree structure 500 to determine that an entry 510 for the 10.0.2.0/22:A network prefix exists in the tree structure 500 and covers the 10.0.2.0/24:A network prefix. If the networking application 257 determines that a partial match for the network prefix does not exist, then the method 400 proceeds to step 435, where the networking application 257 compares the routing information associated with the network prefix to the existing routing information stored in the routing table 220 and/or the forwarding table 230 for the network prefix.

At step 450, the networking application 257 optionally updates the routing information stored in the entry 510 associated with the network prefix based on the comparison performed at step 435. For example, if, at step 435, the networking application 257 determined that the routing information associated with the network prefix included a NH and corresponding ASN not previously included in the existing routing information stored in the entry 510 of the routing table 220, then the networking application 257 would update the routing information stored in the entry 510 to include the additional NH and ASN.

Returning to step 430, if the networking application 257 determines that a partial match exists, then the method 400 proceeds to step 440. At step 440, the networking application 257 compares the routing information associated with the network prefix to the routing information associated with the shorter network prefix to determine a result, such as whether a match exists or whether the similarities exceed a threshold value. In various embodiments, the type of comparison performed at step 440 depends on whether the networking application 257 is implementing a conservative compression technique or an aggressive compression technique.

In the conservative compression technique, at step 440, the networking application 257 determines whether the routing information associated with the network prefix matches the routing information associated with the shorter network prefix. In some embodiments, the networking application 257 determines that a match exists when the routing information associated with the network prefix and the routing information associated with the shorter network prefix include the same NHs and ASNs. Additionally or alternatively, in some embodiments, at step 440, the networking application 257 determines that a match exists when other types of the routing information are associated with both the network prefix and the shorter network prefix.

Figure 5C:
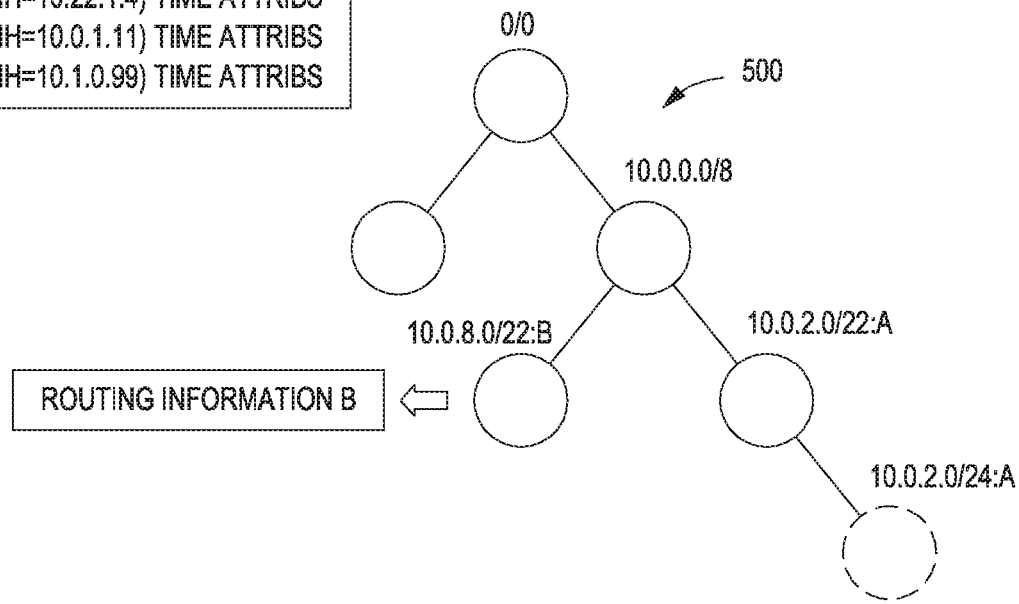

For example, as shown in FIG. 5B, the networking application 257 would determine that a match exists between the routing information associated with the network prefix 10.0.2.0/24:A and the routing information associated with the shorter network prefix 10.0.2.0/22:A, since both network prefixes are associated with Routing Information A, which includes a specific set of NHs, ASNs, etc. Consequently, the method 400 would proceed to step 460, where the networking application 257 would mark the network prefix inactive in the routing table 220 and compress the contents of the forwarding table 230 by removing the network prefix from the forwarding table 230, as shown in FIG. 5C. Alternatively, in embodiments where the network prefix was not initially written at step 425, the networking application 257 would mark the network prefix inactive in the routing table 220 and compress the contents of the forwarding table 230 by determining that the network prefix will not be written in the forwarding table 230, as shown in FIG. 5C.

Next, at step 470, the networking application 257 optionally updates the routing information associated with the shorter prefix to include the routing information associated with the network prefix. For example, if the routing information associated with the network prefix includes one or more NHs and/or ASNs not included in the routing information associated with the shorter network prefix, then that routing information may be associated with the forwarding table 230 entry 510 for the shorter network prefix. However, when the networking application 257 implements the conservative compression technique at step 440, the routing information associated with the shorter prefix may not be updated at step 470, since the routing information associated with the network prefix already matches the routing information stored in the entry 510 for the shorter network prefix. The method 400 then terminates.

Figure 5D:
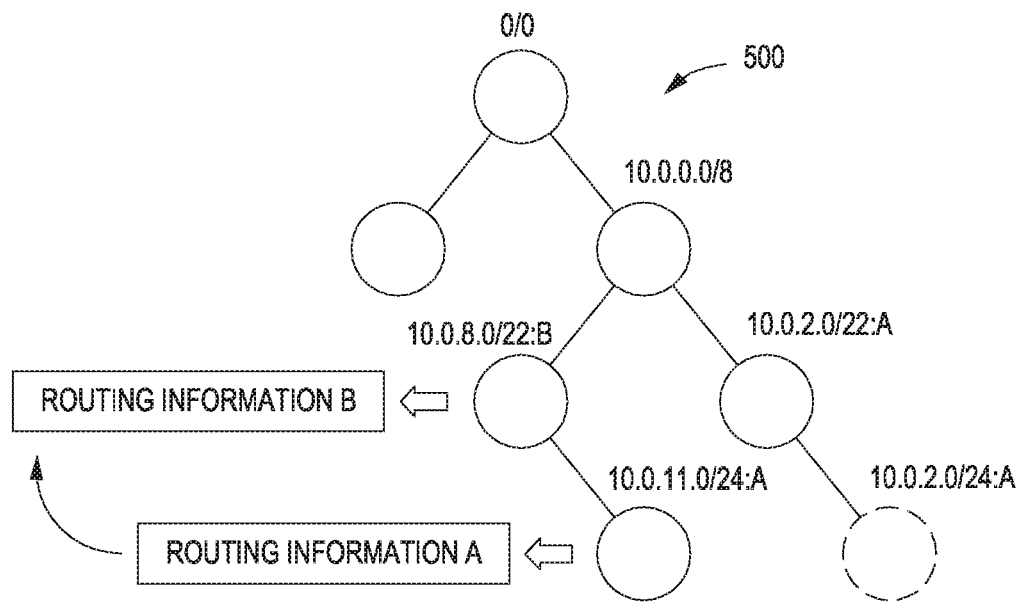

In another example, as shown in FIG. 5D, if the networking application 257 receives another network prefix (10.0.11.0/24:A) and applies the conservative compression technique of step 440 to the network prefix and a shorter network prefix (10.0.8.0/22:B) determined at step 430, then the networking application 257 would determine that a match does not exist. Specifically, Routing Information A associated with the network prefix 10.0.11.0/24:A does not match Routing Information B associated with the shorter network prefix 10.0.8.0/22:B. Consequently, the method 400 would proceed to step 450, and the network prefix 10.0.11.0/24:A would not be removed from the forwarding table 230 at step 460, as shown in the upper portion of FIG. 5E.

By contrast, when the networking application 257 applies the aggressive compression technique at step 440, the networking application 257 determines whether the similarities between the routing information associated with the network prefix and the routing information associated with the shorter network prefix exceed a threshold level. In some embodiments, the networking application 257 determines that the similarities exceed a threshold level when a threshold percentage (e.g., 40%, 60%, 80%, etc.) of the routing information associated with the network prefix is also associated with the shorter network prefix and/or vice versa. For example, with reference to FIG. 5D, if the threshold level is set at 60%, then the networking application 257 would determine that the similarities between Routing Information A associated with network prefix 10.0.11.0/24:A and Routing Information B associated with the shorter network prefix 10.0.8.0/22:6 exceed the threshold level, for example, because two out of three NHs and ASNs associated with the network prefix are also associated with the shorter network prefix and/or because two out of three NHs and ASNs associated with the shorter network prefix are also associated with the network prefix.

Accordingly, if the networking application 257 implements the aggressive compression technique and a threshold level of 60% at step 440, then the method 400 would proceed to step 460. At step 460, the networking application 257 would mark the network prefix 10.0.11.0/24:A inactive in the routing table 220 and compress the contents of the forwarding table 230, either by removing the network prefix from the forwarding table 230 or by not writing the network prefix in the forwarding table 230, as shown in the bottom portion of FIG. 5E. The method 400 would then proceed to step 470, where the networking application 257 optionally updates the routing information associated with the shorter network prefix to include the routing information associated with the network prefix. For example, with reference to FIG. 5D, the networking application 257 could determine that the routing information associated with the shorter network prefix does not include a NH for a particular ASN that is included in the routing information associated with the longer network prefix. Accordingly, at step 470, the networking application 257 would update the routing information associated with the shorter network prefix to include the NH associated with that ASN. The method 400 would then terminate.

If, on the other hand, the networking application 257 implements the aggressive compression technique and a threshold level of 80% at step 440, then the similarities between Routing Information A associated with network prefix 10.0.11.0/24:A and Routing Information B associated with the shorter network prefix 10.0.8.0/22:B (about 66% similarity assuming that two out of three NHs and ASNs are associated with both of the network prefixes) would not exceed the threshold level. Consequently, the method 400 would proceed to step 450.

It is further noted that, if the networking application 257 implements the aggressive compression technique and a threshold level of 60% with respect to network prefix 10.0.2.0/24:A and the shorter network prefix 10.0.2.0/22:A, then the method 400 would proceed to step 460, since the networking application 257 would determine a 100% similarity at step 440. Then, at step 460, the networking application 257 would mark the network prefix 10.0.2.0/24 inactive in the routing table 220 and compress the contents of the forwarding table 230, either by removing the network prefix from the forwarding table 230 or by not writing the network prefix in the forwarding table 230, as shown in FIG. 5C. The method 400 would then proceed to step 470, where the networking application 257 would determine that the routing information associated with the shorter network prefix does not need to be updated. The method 400 would then terminate.

In some embodiments, at step 440, the networking application 257 implements the aggressive compression technique by applying a weighting to one or more items in the routing information. For example, the networking application 257 could retrieve a routing policy from system memory 214 and, based on the routing policy, determine that one or more ASNs are more favorable than one or more other ASNs. The networking application 257 could then apply a weighting to routing information (e.g., a NH) associated with the more favorable ASN(s) and/or apply a weighting to the less favorable ASN(s). Then, when the networking application 257 determines that routing information is not included in both the network prefix and the shorter network prefix, the weighting applied to the non-overlapping routing information may be taken into account when determining whether to collapse/aggregate the routing information associated with the network prefix and the shorter network prefix.

For example, if the networking application 257 determined that ASN3 was a more favorable ASN than ASN1 or ASN2, then the networking application 257 could assign a weighting (e.g., a weighting factor of 2) to each piece of routing information associated with ASN3. Then, with reference to FIG. 5D, the networking application 257 would determine that the similarity between the routing information associated with network prefix 10.0.11.0/24:A and the routing information associated with the shorter network prefix 10.0.8.0/22:B is 50%. More specifically, since the NH associated with ASN3 would, in effect, count as two NHs that are not included in the routing information associated with the shorter network prefix 10.0.8.0/22 (due to the weighting factor applied to routing information associated with ASN3), the shorter network prefix 10.0.8.0/22:B would be associated with only 50% of the routing information associated with the longer network prefix 10.0.11.0/24:A.

Returning to step 480, after the networking application 257 determines that the network prefix is to be withdrawn from the routing table 220 and forwarding table 230, the networking application 257 determines whether an exact match exists for the network prefix in the routing table 220 and/or the forwarding table 230. If an exact match exists, then the method 400 proceeds to step 490, where the networking application 257 determines whether there is more than one NH associated with the network prefix.

If, at step 490, there is more than one NH associated with the network prefix, then the networking application 257 performs a route selection process on the NHs associated with the network prefix based on one or more criteria, such as route preference and/or route efficiency. Based on the route selection process, one or more NHs associated with the network prefix may be removed from the routing table 220 and forwarding table 230. The method 400 then proceeds to step 420, described above. If the networking application 257 determines that there is only one NH associated with the network prefix, then, at step 494, the networking application 257 deletes the entry 510 associated with the NH from the routing table 220 and the forwarding table 230. The method 400 then terminates.

If, at step 480, the networking application 257 determines that the network prefix covers one or more longer network prefixes, then, at step 482, the networking application 257 deletes the withdrawn network prefix from the routing table 220 and forwarding table 230. Then, at step 484, the networking application 257 selects a longer network prefix covered by the withdrawn network prefix and the method 400 proceeds to step 420, described above. In addition, if the withdrawn network prefix covers multiple longer network prefixes, then the networking application 257 may perform steps 420 through 470 for each of the longer network prefixes.

Although the technique of FIG. 4 is described with respect to forwarding table 230, in various embodiments, some or all of the technique may be performed offline. For example, in some embodiments, a listing of network prefixes may be received at step 410 and compressed offline via steps 420 thru 480. Further, in some embodiments, the technique may be performed offline in order to initially compress a listing of network prefixes and also may be performed on an ongoing basis, when additional network prefixes are received by the networking application 257.

Second Compression Pass

Figure 6:
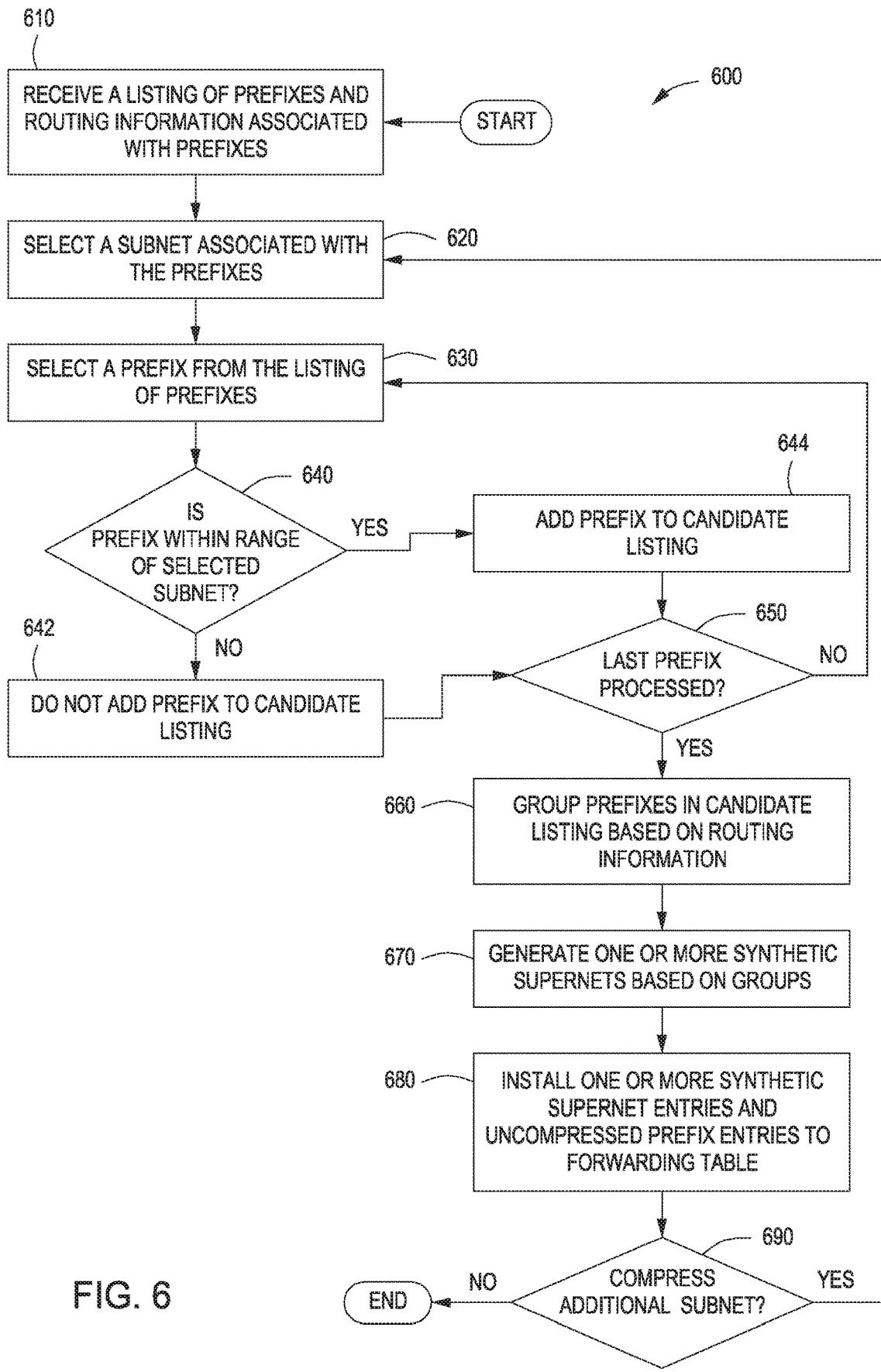
FIG. 6 illustrates a flow diagram of method steps for compressing a forwarding table during a second compression pass, according to various embodiments of the present invention.

FIG. 6 illustrates a flow diagram of method steps for compressing a forwarding table 230 during a second compression pass, according to various embodiments of the present invention. Although the method steps are described in conjunction with the systems of FIGS. 1-3, 5A-5E, 7A-7B, and 8 persons skilled in the art will understand that any system configured to perform the method steps, in any order, falls within the scope of the present invention.

As shown in FIG. 6, a method 600 begins at step 610, where the networking application 257 receives a listing of network prefixes and routing information associated with the network prefixes. In various embodiments, the listing of network prefixes may be received via any of the techniques described above. For example, the listing of network prefixes may be received when a gateway service discovers a new destination node in the network 105, received from a registry service, read from a routing table 220 and/or a forwarding table 230, etc. For clarity of explanation, the method 600 of FIG. 6 is described in conjunction with a listing of network prefixes that includes the limited number of network prefixes shown in the tree structure 500 of FIG. 7A. However, the method 600 can be implemented with any data structure storing any number of network prefixes.

In various embodiments, the listing of network prefixes may include network prefix state that indicates, for example, where a network prefix is in an allocation pool and whether the network prefix is allocated, reserved, or assigned. Additionally, the networking application 257 may receive other types of information associated with the network prefixes, including geographic characteristics of a network prefix (e.g., a continent, state, province, etc. associated with a network prefix) and/or traffic policies associated with a network prefix. Further, the networking application 257 may receive or determine information indicating whether the network prefixes are included in an address space that is allocated, reserved (e.g., nonpublic address space), legacy (e.g., assigned to a governmental agency), etc.

At step 620, the networking application 257 selects a subnet associated with the listing of network prefixes. In various embodiments, the networking application 257 analyzes one or more subnets having a fixed size, such as a /8 subnet, a /16 subnet, a /24 subnet, etc. and then selects a subnet based on the analysis. For example, the networking application 257 could analyze a /8 subnet (e.g., 10.0.0.0/8) to determine a median network prefix associated with the /8 subnet. The networking application 257 could then select the subnet associated with the median network prefix as a starting point for the second compression pass. Alternatively, the networking application 257 could determine the median network prefix, subtract one routing mask bit from the network prefix, and use the corresponding subnet as a starting point for the second compression pass.

In some embodiments, the networking application 257 could prefer to compress of certain ranges of network prefixes and/or prevent compression of certain ranges of network prefixes, for example, by associating metadata with the network prefixes. For example, the networking application 257 could prevent the compression of network prefixes associated with specific Internet service providers (ISPs), content providers, agencies, etc. from being compressed so that specific types of routing information associated with the network prefixes is not lost. Such network prefixes could be passed to the forwarding table 230 without applying compression. Additionally, the networking application 257 could group certain network prefix ranges based on how the ranges are allocated by an RIR. For example, the 1.0.0.0/8 network prefix is, for the most part, associated with parts of Asia. In such network prefix ranges, traffic could be influenced towards certain ISPs, for example, based on business relationships, and/or traffic could be routed around certain ISPs.

Next, at step 630, the networking application 257 selects a network prefix included in the listing of network prefixes received at step 610. At step 640, the networking application 257 then determines whether the network prefix is within range of the subnet selected as step 620. If the networking application 257 determines that the network prefix is within range of the selected subnet, then the method 600 proceeds to step 644, where the networking application 257 adds the network prefix to a candidate listing. If, on the other hand, the networking application 257 determines that the network prefix is not within range of the selected subnet, then the method 600 proceeds to step 642, where the networking application 257 does not add the network prefix to the candidate listing. The method 600 then proceeds to step 650, where the networking application 257 determines whether the last network prefix included in the listing of network prefixes has been processed. If the networking application 257 determines that the last network prefix included in the listing of network prefixes has not been processed, then the methods 600 returns to step 630, where the networking application 257 selects another network prefix. If the networking application 257 determines that the last network prefix included in the listing of network prefixes has been processed, then the methods 600 proceeds to step 660.

Figure 7A:
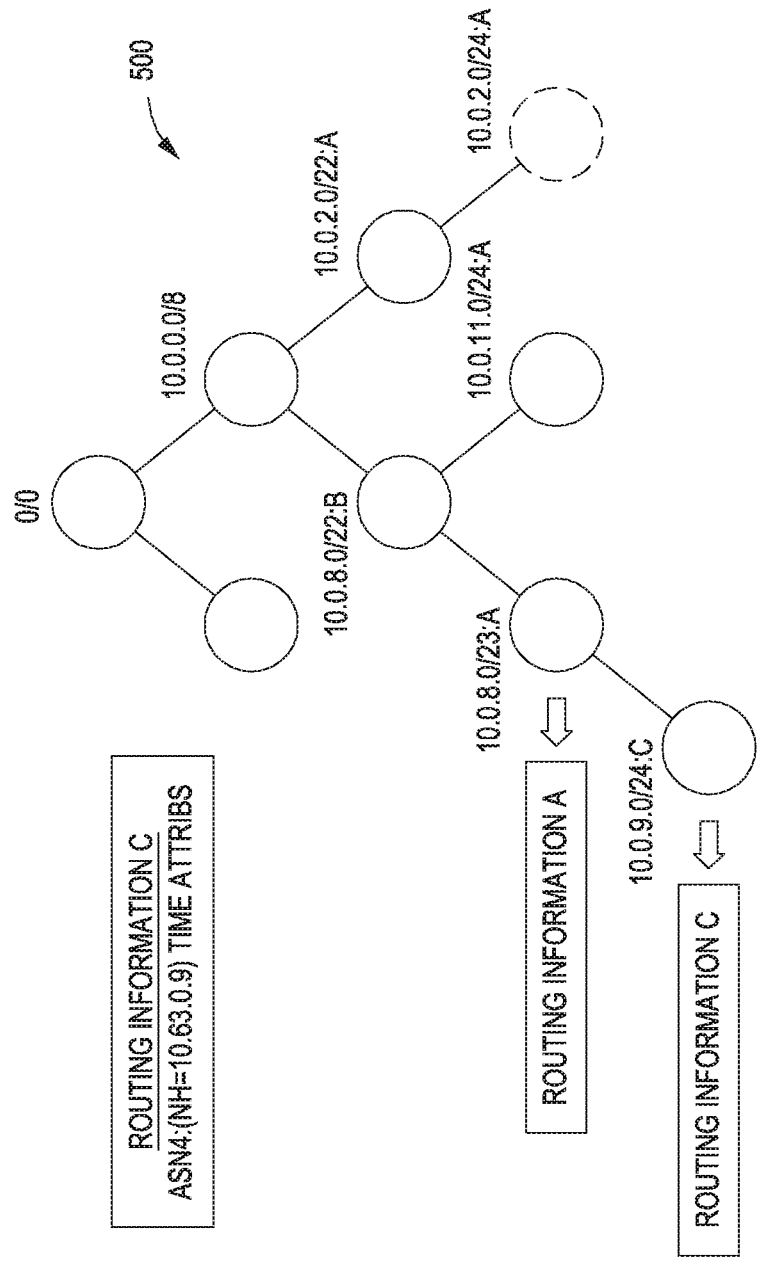
FIGS. 7A and 7B illustrate different entries of a tree structure that are generated during a second compression pass, according to various embodiments of the present invention.
Figure 7B:
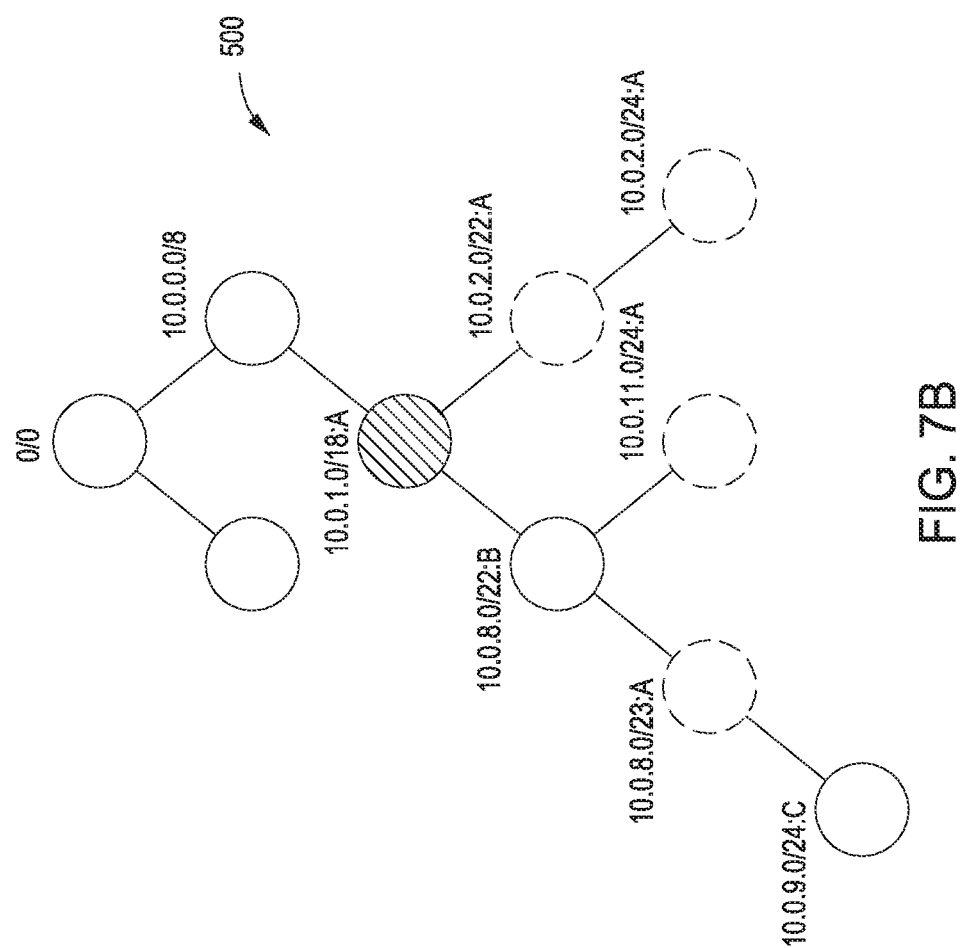

With reference to the example shown in FIGS. 7A and 7B, the networking application 257 could select the subnet associated with 10.0.1.0/18 at step 620. Then, at step 630, the networking application 257 could select network prefix 10.0.9.0/24:C and, at step 640, determine that network prefix 10.0.9.0/24:C is within range of the subnet associated with 10.0.1.0/18. Consequently, at step 644, the networking application 257 would add network prefix 10.0.9.0/24:C to the candidate listing. Next, at step 650, the networking application 257 would determine that the last network prefix has not yet been processed, and the method 600 would return to step 630. At step 630, the networking application 257 could select another network prefix (e.g., 10.0.11.0/24:A, 10.0.8.0/23:A, or 10.0.2.0/22:A) and, at step 640, determine whether the network prefix is within range of the subnet associated with 10.0.1.0/18. The method 600 would then proceed to either step 642 or step 644.

In some embodiments, the networking application 257 performs steps 620-650 in an iterative manner. For example, the networking application 257 could select a particular subnet at step 620 and then perform steps 630 thru 650 with respect to that subnet. Then, upon reaching the last network prefix in the listing of network prefixes, the networking application 257 could subtract one bit from the routing mask associated with the subnet and again perform steps 630 thru 650 with respect to the larger subnet. In some embodiments, this iterative process could be repeated until the largest feasible synthetic supernet has been selected and analyzed with respect to the listing of network prefixes. The method 600 could then proceed to step 660.

Next, at step 660, the networking application 257 groups the network prefixes included in the candidate listing based on the routing information associated with the network prefixes. In some embodiments, the networking application 257 generates a different subgroup for each type of routing information. For example, with reference to FIGS. 7A and 7B, the networking application 257 could generate a first subgroup for Routing Information A, a second subgroup for Routing Information B, and a third subgroup for Routing Information C. Further, in this particular example, network prefixes 10.0.11.0/24:A, 10.0.8.0/23:A, and 10.0.2.0/22:A would be added to the first subgroup, network prefix 10.0.8.0/22:6 would be added to the second subgroup, and network prefix 10.0.9.0/24:C would be added to the third subgroup.

In some embodiments, network prefixes could be grouped based on other types of information, such as geographic characteristics of the network prefixes and/or traffic policies associated with the network prefixes. For example, the networking application 257 could group network prefixes that are associated with the same or similar routing information, associated with the same or similar geographic location, and/or associated with the same or similar traffic policies. In some embodiments, subgroups could be determined based on whether similarities meet a threshold level (e.g., a percentage similarity between routing information, geographic information, and/or traffic policy), as described above in conjunction with the aggressive compression technique of FIGS. 4 and 5E.

In a specific example, the networking application 257 could generate subgroups of network prefixes that share both the same routing information (e.g., Routing Information A) and the same continent (e.g., the North America). Additionally, in this example, the networking application 257 could also require network prefixes to be associated with similar traffic policies for the network prefixes to be included in the same subgroup. In other embodiments, the networking application 257 could generate subgroups of network prefixes that share both the same routing information and the same or similar traffic policies.

Next, at step 670, the networking application 257 generates a synthetic supernet based on the subgroups generated at step 660. In some embodiments, the networking application 257 generates a synthetic supernet based on the subgroup having the largest count of network prefixes. For example, as shown in FIG. 7B, the networking application 257 could generate synthetic supernet 10.0.1.0/18:A, enabling the number of network prefixes entries to be reduced by two. In particular, network prefixes 10.0.11.0/24:A, 10.0.8.0/23:A, and 10.0.2.0/22:A associated with Routing Information A could be removed from or not installed into the forwarding table 230, and a single synthetic supernet entry that covers these network prefixes could be generated.

At step 680, the networking application 257 installs the synthetic supernet (e.g., 10.0.1.0/18:A) and the remaining, uncompressed network prefix entries (e.g., 10.0.8.0/22:6 and 10.0.9.0/24:C) to the forwarding table 230. Accordingly, in various embodiments, a synthetic supernet—a supernet that was not initially present in the listing of network prefixes received at step 610—is generated and/or installed to the forwarding table 230. Further, in the example shown in FIGS. 7A and 7B, only three network prefix entries (i.e., the synthetic supernet entry and two entries associated with the uncompressed network prefix entries) are installed into the forwarding table 230, instead of the five network prefix entries that were present at the beginning of the second compression pass. The method 600 then proceeds to step 690, where the networking application 257 determines whether to compress another subnet. If the networking application 257 determines that an additional subnet is to be compressed, then the method 600 returns to step 620. If the networking application 257 determines that no additional subnets are to be compressed, then the method 600 terminates.

For clarity of illustration, the tree structure 500 shown in FIGS. 5A-5E, 7A, and 7B includes a limited number of entries. However, in various embodiments, a tree structure 500 and/or a listing of network prefixes having any number of entries may be processed by the networking application 257 to perform a first compression pass and/or a second compression pass. In some embodiments, the second compression pass is performed on the results of the first compression pass. In other embodiments, the second compression pass may be performed on a listing of network prefixes, a tree structure 500, a forward table 230, etc. that the networking application 257 has not compressed via the first compression pass described in conjunction with FIGS. 4 and 5A-5E.

Although the technique of FIG. 6 is described with respect to forwarding table 230, in various embodiments, some or all of the technique may be performed offline. For example, in some embodiments, a listing of network prefixes may be received at step 610 and compressed offline via steps 620 thru 690. Further, in some embodiments, the technique may be performed offline in order to initially compress a listing of network prefixes and also may be performed on an ongoing basis, when additional network prefixes are received by the networking application 257.

FIG. 8 illustrates network prefix entries associated with a portion of a subnet, according to various embodiments of the invention. As shown, the synthetic supernet entry generated at step 670 includes the address spaces associated with subnet 10.0.2.0/22:A, subnet 10.0.8.0/23:A, and subnet 10.0.11.0/24:A. As further shown, the uncompressed network prefixes associated with subnet 10.0.8.0/22:6 and subnet 10.0.9.0/24:C remain as separate entries.

In sum, in a first compression pass, a networking application receives a network prefix and performs a lookup on a routing table and/or forwarding table to find a partial match associated with the network prefix. If a partial match exists, then the networking application compares routing information associated with the network prefix to routing information associated with the partial match (e.g., a shorter network prefix). Based on the similarities between the routing information associated with the network prefix and the routing information associated with the partial match, the networking application then determines whether the forwarding table should be compressed by removing the network prefix from the forwarding table and aggregating the corresponding routing information in an entry associated with the partial match.

Further, in a second compression pass, the networking application selects a subnet and determines which network prefixes included in a listing of network prefixes are in the range of a selected subnet. The networking application then groups the resulting network prefixes based on routing information and selects a subgroup of network prefixes, for example, the subgroup having the highest count of network prefixes. Finally, the networking application generates a synthetic supernet associated with the subgroup of network prefixes and installs the synthetic supernet to a forwarding table.

At least one advantage of the disclosed techniques is that the number of entries included in a forwarding table can be reduced without discarding routing information associated with the destination nodes tracked by the forwarding table. As a result, a greater number of routes may be stored in the forwarding table and/or the memory requirements of the forwarding table may be reduced.

The descriptions of the various embodiments have been presented for purposes of illustration, but are not intended to be exhaustive or limited to the embodiments disclosed. Many modifications and variations will be apparent to those of ordinary skill in the art without departing from the scope and spirit of the described embodiments.

Aspects of the present embodiments may be embodied as a system, method or computer program product. Accordingly, aspects of the present disclosure may take the form of an entirely hardware embodiment, an entirely software embodiment (including firmware, resident software, microcode, etc.) or an embodiment combining software and hardware aspects that may all generally be referred to herein as a "module" or "system." Furthermore, aspects of the present disclosure may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

Aspects of the present disclosure are described above with reference to flowchart illustrations and/or block diagrams of methods, apparatus (systems) and computer program products according to embodiments of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, enable the implementation of the functions/acts specified in the flowchart and/or block diagram block or blocks. Such processors may be, without limitation, general purpose processors, special-purpose processors, application-specific processors, or field-programmable The flowchart and block diagrams in the Figures illustrate the architecture, functionality, and operation of possible implementations of systems, methods and computer program products according to various embodiments of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

While the preceding is directed to embodiments of the present disclosure, other and further embodiments of the disclosure may be devised without departing from the basic scope thereof, and the scope thereof is determined by the claims that follow.

I claim:

1. A non-transitory computer-readable storage medium including instructions that, when executed by a processor, cause the processor to perform the steps of:
   selecting, from a listing of network prefixes, one or more network prefixes that are within a range of a subnet;
   sorting the one or more network prefixes based on a set of routing information related to at least one of geographic region or traffic policy to generate one or more subgroups of network prefixes;
   selecting a first subgroup of network prefixes included in the one or more subgroups of network prefixes; and
   generating a synthetic supernet based on the first subgroup of network prefixes.

2. The non-transitory computer-readable storage medium of claim 1, wherein the first subgroup of network prefixes is associated with first routing information included in the set of routing information.

3. The non-transitory computer-readable storage medium of claim 2, wherein the first routing information comprises one or more next hops.

4. The non-transitory computer-readable storage medium of claim 1, further comprising determining that a similarity between first routing information included in the set of routing information and associated with the first subgroup of network prefixes exceeds a threshold level, and, in response, generating the synthetic supernet.

5. The non-transitory computer-readable storage medium of claim 1, wherein first routing information included in the set of routing information and associated with a first network prefix included in the first subgroup of network prefixes is different from second routing information included in the set of routing information and associated with a second network prefix included in the first subgroup of network prefixes.

6. The non-transitory computer-readable storage medium of claim 1, wherein the synthetic supernet corresponds to a network prefix that is not included in the listing of network prefixes.

7. The non-transitory computer-readable storage medium of claim 1, wherein each network prefix included in the first subgroup of network prefixes is associated with a first subset of routing information included in the set of routing information, and further comprising associating the synthetic supernet with the first subset of routing information.

8. The non-transitory computer-readable storage medium of claim 7, further comprising determining that the first subgroup of network prefixes should not be copied from a routing table to the forwarding table.

9. The non-transitory computer-readable storage medium of claim 1, further comprising writing a network prefix of the synthetic supernet to the single entry included in the forwarding table, and associating the single entry with first routing information included in the set of routing information.

10. A method, comprising:
    selecting, from a listing of network prefixes, one or more network prefixes that are within a range of a subnet;
    sorting the one or more network prefixes based on a set of routing information related to at least one of geographic region or traffic policy to generate one or more subgroups of network prefixes;
    selecting a first subgroup of network prefixes included in the one or more subgroups of network prefixes; and
    generating a synthetic supernet based on the first subgroup of network prefixes.

11. The method of claim 10, wherein the first subgroup of network prefixes is associated with first routing information included in the set of routing information.

12. The method of claim 11, wherein the first routing information comprises one or more next hops.

13. The method of claim 10, further comprising determining that a similarity between first routing information included in the set of routing information and associated with the first subgroup of network prefixes exceeds a threshold level, and, in response, generating the synthetic supernet.

14. The method of claim 10, wherein first routing information included in the set of routing information and associated with a first network prefix included in the first subgroup of network prefixes is different from second routing information included in the set of routing information and associated with a second network prefix included in the first subgroup of network prefixes.

15. The method of claim 10, wherein the synthetic supernet corresponds to a network prefix that is not included in the listing of network prefixes.

16. The method of claim 10, wherein each network prefix included in the first subgroup of network prefixes is associated with a first subset of routing information included in the set of routing information, and further comprising associating the synthetic supernet with the first subset of routing information.

17. The method of claim 16, further comprising writing a network prefix of the synthetic supernet to the single entry included in the forwarding table, and associating the single entry with first routing information included in the set of routing information.

18. The method of claim 16, further comprising determining that the first subgroup of network prefixes should not be written copied from a routing table to the forwarding table.

19. A system, comprising:
a memory storing instructions; and
a processor that is coupled to the memory and, when executing the instructions, is configured to:
select, from a listing of network prefixes, one or more network prefixes that are within a range of a subnet,
sort the one or more network prefixes based on a set of routing information related to at least one of geographic region or traffic policy to generate one or more subgroups of network prefixes,
select a first subgroup of network prefixes included in the one or more subgroups of network prefixes, and
generate a synthetic supernet based on the first subgroup of network prefixes.

20. The system of claim 19, wherein the first subgroup of network prefixes is associated with first routing information included in the set of routing information.

21. The system of claim 20, wherein the first routing information comprises one or more next hops.

22. The system of claim 19, wherein the processor is further configured to determine that a similarity between first routing information included in the set of routing information and associated with the first subgroup of network prefixes exceeds a threshold level, and, in response, generate the synthetic supernet.

23. The system of claim 19, wherein first routing information included in the set of routing information and associated with a first network prefix included in the first subgroup of network prefixes is different from second routing information included in the set of routing information and associated with a second network prefix included in the first subgroup of network prefixes.

24. The system of claim 19, wherein the synthetic supernet corresponds to a network prefix that is not included in the listing of network prefixes.

25. The system of claim 19, wherein each network prefix included in the first subgroup of network prefixes is associated with a first subset of routing information included in the set of routing information, and wherein the processor is further configured to associate the synthetic supernet with the first subset of routing information.

26. The system of claim 25, wherein the processor is further configured to determine that the first subgroup of network prefixes should not be copied from a routing table to the forwarding table.

27. The system of claim 19, wherein the processor is further configured to write a network prefix of the synthetic supernet to the single entry included in the forwarding table, and associate the single entry with first routing information included in the set of routing information.

* * * * *

UNITED STATES PATENT AND TRADEMARK OFFICE
CERTIFICATE OF CORRECTION

PATENT NO. : 10,778,581 B2
APPLICATION NO. : 16/209896
DATED : September 15, 2020
INVENTOR(S) : David Bannister Page 1 of 1

It is certified that error appears in the above-identified patent and that said Letters Patent is hereby corrected as shown below:

In the Claims

Column 19, Claim 18, Line 31, please delete "written".

Signed and Sealed this
Seventeenth Day of November, 2020

Andrei Iancu
*Director of the United States Patent and Trademark Office*